United States Patent Office 3,498,054
Patented Mar. 3, 1970

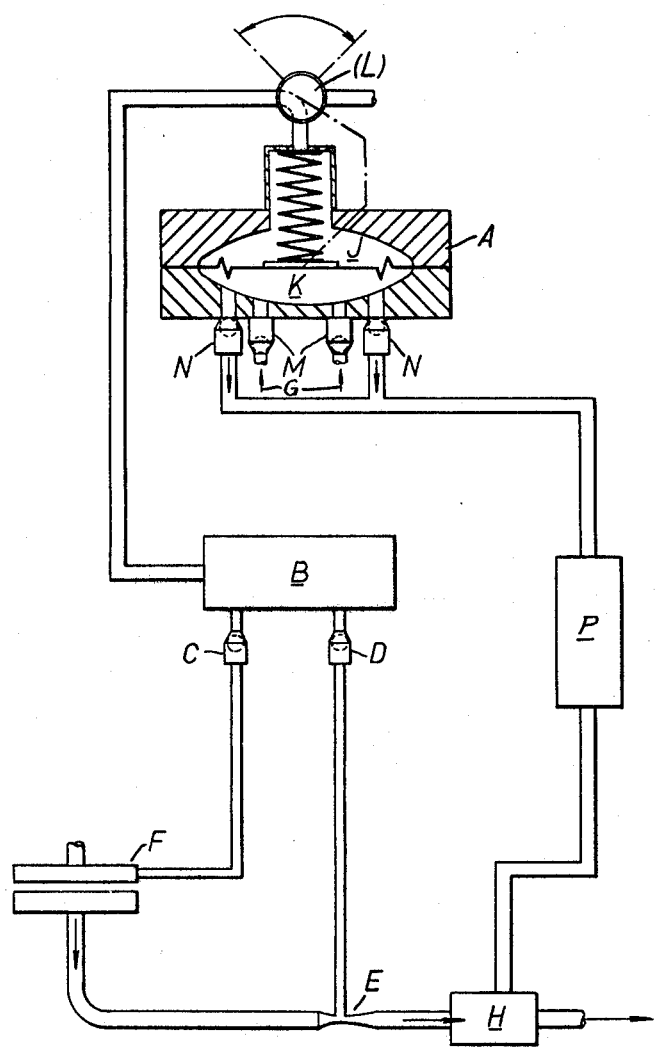

3,498,054
EXHAUST PURIFICATION
William D. L. Theed, Wargrave, England, assignor to Sir George Godfrey & Partners (Holdings) Limited, West Hanworth, Middlesex, England
Filed Dec. 14, 1965, Ser. No. 513,751
Int. Cl. F01n 3/14; B01d 53/34
U.S. Cl. 60—30                        11 Claims

ABSTRACT OF THE DISCLOSURE

Arrangement for purification of the exhaust from an automobile engine. A catalytic chamber is included in the exhaust pipe and is supplied with air by a positive displacement diaphragm pump operated by the pressure depression at the engine induction.

---

This invention relates to the catalytic purification of the exhaust from an internal combustion engine, which is one method now under investigation of tackling a growing problem and dealing with contamination of the atmosphere by exhaust from a motor car engine.

One object of the present invention is to provide a satisfactory arrangement for supplying oxygen to the catalyst, which might for example be platinum.

According to the present invention, a pump arranged to supply air to a catalyst chamber arranged for catalytic purification of the exhaust from an engine is operated by the pressure depression at the engine induction, and is preferably a diaphragm pump or the equivalent.

The pump will preferably be of the kind operated by negative pressure, for example by having two chambers separated by a diaphragm, one of which is connected intermittently to the vacuum as the diaphragm moves to and fro. There is thus conveniently a connection between the engine induction and the pump and this may include a reservoir having a non-return valve at its inlet for maintaining a more or less steady pressure depression.

The obvious way of supplying oxygen to the catalyst in the exhaust pipe is by way of a compressor driven by the engine and merely pumping air to the catalyst, but such a system involves complications in installation in arranging for the drive to the compressor and in maintenance, and would in general only be feasible as applied to new motor cars and not to the modification of existing cars. Moreover, the amount of air supplied will tend to vary from being too little at engine tick-over to being too much at full throttle.

However, the diaphragm pump system now proposed avoids the second difficulty because of the good pressure depression at the engine induction during idling.

At full throttle the depression at the engine induction is reduced, but this can be compensated for to some extent by means of a connection to the reservoir from the throat of a venturi in the engine exhaust, which can also produce pressure depression in the reservoir via a non-return valve.

The venturi and catalyst chamber would be conveniently in a single assembly with the exhaust pipe, possibly taking the place of a conventional silencer. This arrangement avoids the first objection to an engine driving a compressor referred to above, in that the only additional connection is one to the engine induction.

The invention may be carried into practice in various ways and one embodiment will be briefly described by way of example with reference to the accompanying drawing, of which the single figure is a sketch showing the preferred arrangement diagrammatically.

The exhaust from the engine passes through the venturi E and over the catalyst H to which air containing the necessary oxygen is pumped from the atmosphere at G by way of the pump chamber K by the diaphragm pump A whose operating chamber J is supplied through a first conduit means from a reservoir B connected to the engine induction F through a non-return valve C.

On the induction movement of the diaphragm the diaphragm moves against a compression spring under the action of the reservoir B until it operates a change-over valve L mechanically to connect the chamber J to atmosphere. Then the spring returns the diaphragm forcing the air introduced into the chamber K during the induction movement to the catalyst chamber after which the valve L changes over again.

The inlet to the pump chamber K is through non-return valves M, and the discharge is through a third conduit means including piping connecting non-return valves N, a surge tank P, and a catalyst H.

The venturi E is connected in the exhaust pipe just upstream of the catalyst H and a connection from the throat leads to the reservoir B through a non-return valve D.

The arrangement is such that operation of the engine causes a pressure depression in the reservoir B to operate the pump A for pumping the necessary air to the catalyst H.

There is good depression in the reservoir B during engine idling so that sufficient air can be obtained, and the connection from the venturi E provides an alternative depression to compensate for loss of depression at the induction F at full throttle.

The only connection necessary, apart from replacing an existing exhaust pipe and silencer by a modified exhaust pipe, is a pipe to the engine induction. The pump and reservoir can be mounted in any convenient place. The catalyst chamber might provide sufficient silencing or a conventional silencer may still be necessary.

This makes installation simple on existing cars, in particular on cars which have been exported. Moreover, it is contemplated that the maintenance of the simple mechanism will be low.

What I claim as my invention and desire to secure by Letters Patent is:

1. A system for catalytic purification of the exhaust from an internal combustion engine including an engine induction and an exhaust pipe, the improvement comprising a catalyst chamber in the exhaust pipe, a positive displacement pump having an air inlet for drawing in atmospheric air and an air outlet, third conduit means connecting said pump outlet to said catalyst chamber to supply said atmospheric air from said pump to said catalyst chamber, and a first conduit means connecting the engine induction to said pump for drawing operating air from said pump to the engine induction for operating said pump, the amount of said opearting air being dependent on the pressure depression at the engine induction.

2. A system as claimed in claim 1 in which the pump is a diaphragm pump.

3. A system as claimed in claim 1 in which a reservoir having an inlet and an outlet is provided in said first conduit means, said reservoir having a non-return valve at its outlet.

4. A system as claimed in claim 2 further including a venturi in the engine exhaust, said venturi having an inlet at the throat thereof, said reservoir having a further outlet, and a second conduit connecting said further outlet of said reservoir to said inlet at the throat of said venturi, said second conduit means having a non-return valve therein whereby an alternative source of pressure depression to operate said pump is provided to compensate for loss of depression at said engine induction.

5. Apparatus for catalytic purification of the exhaust from an internal combustion engine having an exhaust pipe, the improvement comprising a catalyst chamber in communication with and assembled on the engine exhaust pipe, a pressure-operated positive displacement pump having an air inlet for drawing in atmospheric air and an air outlet, third conduit means connecting said pump outlet to said catalyst chamber for delivering air thereto, and first conduit means connecting said pump to an operating chamber in the engine induction for drawing operating air from the pump to the engine induction for operating said pump.

6. Apparatus as claimed in claim 5 including a surge tank in said third conduit means.

7. Apparatus as claimed in claim 5 including a reservoir having an inlet and an outlet in said first conduit means, said reservoir having a non-return valve at its outlet.

8. Apparatus as claimed in claim 7 further comprising a venturi in the exhaust pipe for passage of the exhaust gases, said venturi having an inlet at the throat thereof, said reservoir having a further outlet, and second conduit means connecting said further outlet in said reservoir to the inlet at the throat of said venturi, said second conduit means having a non-return valve therein.

9. Apparatus as claimed in claim 5 in which the pump is a diaphragm pump.

10. Apparatus as claimed in claim 9 in which the pump has an inlet connected to atmosphere through a non-return valve.

11. Apparatus for catalytic purification of the exhaust from an internal combustion engine comprising a catalyst chamber in communication with and assembled on the engine exhaust pipe, a pressure operated positive displacement diaphragm pump having a chamber having air inlets thereon for receiving atmospheric air and having air outlets thereon, third conduit means connecting said outlets of said pump to said catalyst chamber for delivering air thereto, first conduit means connecting said pump to an engine induction in the engine, said first conduit means including a reservoir having an outlet therein, a venturi assembled in the exhaust pipe for passage of the exhaust gases, second conduit means having a non-return valve and connecting said reservoir outlet to the throat of said venturi, and a changeover valve on said pump mechanically operable to connect the chamber of said diaphragm pump to atmosphere.

References Cited
UNITED STATES PATENTS

| | | | |
|---|---|---|---|
| 2,854,816 | 10/1958 | Bodine. | |
| 3,059,420 | 10/1962 | Schnabel | 23—288 X |
| 3,220,179 | 11/1965 | Bloomfield | 23—288 X |
| 3,220,805 | 11/1965 | Fowler et al. | 23—288 |
| 3,106,821 | 10/1963 | Ridgway | 60—30 |

JOSEPH SCOVRONEK, Primary Examiner

U.S. Cl. X.R.

23—288